US012720447B2

(12) United States Patent
Hooli et al.

(10) Patent No.: US 12,720,447 B2
(45) Date of Patent: Aug. 25, 2026

(54) METHOD AND APPARATUS FOR FACILITATING NETWORK CONTROL

(71) Applicant: Nokia Technologies Oy, Espoo (FI)

(72) Inventors: Kari Juhani Hooli, Oulu (FI); Hiromasa Umeda, Tokyo (JP); Nhat-Quang Nhan, Massy (FR); Oskari Tervo, Oulu (FI); Marco Maso, Massy (FR)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/433,758

(22) Filed: Feb. 6, 2024

(65) Prior Publication Data

US 2024/0292343 A1 Aug. 29, 2024

Related U.S. Application Data

(60) Provisional application No. 63/486,760, filed on Feb. 24, 2023.

(51) Int. Cl.
*H04W 52/36* (2009.01)
*H04W 52/14* (2009.01)
*H04W 72/1268* (2023.01)

(52) U.S. Cl.
CPC ....... *H04W 52/367* (2013.01); *H04W 52/146* (2013.01); *H04W 52/365* (2013.01); *H04W 72/1268* (2013.01)

(58) Field of Classification Search
None
See application file for complete search history.

(56) References Cited

U.S. PATENT DOCUMENTS

2022/0030659 A1* 1/2022 Kim ...................... H04W 28/06
2022/0116891 A1* 4/2022 Yao ..................... H04W 52/365
(Continued)

FOREIGN PATENT DOCUMENTS

WO 2024/028669 A1 2/2024

OTHER PUBLICATIONS

Extended European Search Report received for corresponding European Patent Application No. 24156093.7, dated Jul. 15, 2024, 7 pages.

(Continued)

*Primary Examiner* — Jay L Vogel
(74) *Attorney, Agent, or Firm* — Robert P. Michal, Esq.; Rimon PC

(57) ABSTRACT

A method, apparatus, and computer readable medium facilitate network control by allowing a base station to predict when power class fallback will occur in user equipment. In the context of a method, the method receives a message comprising information about at least one of a first power class or a maximum duty cycle associated with user equipment. The method determines, based on at least the first power class or the maximum duty cycle, a threshold duty cycle for the user equipment. The method causes the threshold duty cycle to be transmitted to the user equipment. The method determines an uplink transmission schedule for the user equipment based at least on the first power class or the maximum duty cycle. The method receives, from the user equipment, a report that the threshold duty cycle has been exceeded by the user equipment.

10 Claims, 8 Drawing Sheets

(56) References Cited

U.S. PATENT DOCUMENTS

2022/0264481 A1 * 8/2022 Caporal Del Barrio ..................... H04W 52/367
2024/0196394 A1 * 6/2024 Guo .................... H04W 52/365

OTHER PUBLICATIONS

"About MPE enhancement", 3GPP TSG-RAN WG4 Meeting #93, R4-1914153, Agenda: 9.14.1, Oppo, Nov. 18-22, 2019, 4 pages.
"Necessity of reporting power class being used by a UE", 3GPP TSG-RAN4 Meeting #106, R4-2300039, Agenda: 9.26.1, Nokia, Feb. 27-Mar. 3, 2023, 5 pages.
"3rd Generation Partnership Project; Technical Specification Group Radio Access Network; NR; User Equipment (UE) radio transmission and reception; Part 1: Range 1 Standalone (Release 18)", 3GPP TS 38.101-1, V18.0.0, Dec. 2022, 758 pages.
"Discussion on HPUE NR TDD UL DL configurations", 3GPP TSG-RAN WG4 #86, R4-1801584, Agenda: 7.4.7.8, OPPO, Feb. 26-Mar. 2, 2018, pp. 1-3.
"Power-class fallback reporting in the PHR for improved scheduling and enhanced network performance with SAR constraints", TSG-RAN Working Group 4 (Radio) meeting #105, R4-2218828, Agenda: 8.24.1, Ericsson, Nov. 14-18, 2022, 8 pages.
Office action received for corresponding European Patent Application No. 24156093.7, dated Oct. 7, 2025, 3 pages.

* cited by examiner

METHOD AND APPARATUS FOR FACILITATING NETWORK CONTROL

RELATED APPLICATION

This application claims priority to U.S. provisional Application No. 63/486,760 filed Feb. 24, 2023, which is incorporated herein by reference in its entirety.

TECHNOLOGICAL FIELD

An example embodiment relates generally to techniques for facilitating network control and, more particularly, to techniques for communicating information regarding power class fallback between user equipment and a base station.

BACKGROUND

User equipment often communicates information to a base station or network to inform scheduling of uplink transmissions from the user equipment to the base station or network. Such information may consist of at least one power class that the user equipment supports. Such information may at times consist of a maximum duty cycle supported by the user equipment, which when exceeded, will cause the user equipment to fall back to a lower power class. However, even with this information, a base station or network may be unable to determine when user equipment is likely to fall back to a lower power class. Under current methods, the base station or network does not know over what time period the user equipment is evaluating the duty cycle. The base station or network may know that the evaluation period is at least a 10 millisecond (ms) radio frame, but the exact duration is left for user equipment implementation. It is also left unspecified whether the evaluation period is sliding in time (e.g., a sliding window) or if evaluation periods are sequential and non-overlapping. As a consequence of this, the user equipment may fall back to a lower power class at any point since the base station or network doesn't know the actual location, usage, or length of the evaluation period. As a consequence, the user equipment then applies the requirements of the lower power class. For example, the user equipment may operate with reduced total maximum power output due to the requirements of the lower power class. This may detrimentally affect scheduling.

Change of applied requirements due to power class fallback can complicate scheduling and link adaptation. For example, it can complicate relationships between an additional maximum power reduction value and resource block (RB) allocation that change between power classes for some bands and network signaling values (e.g., with NS-01 for band n1). Therefore, the user equipment's configured maximum transmission power can change based on RB allocation in a way that is unexpected to a network or base station. As another example, maximum sensitivity degradation requirements for a band combination can vary significantly between power classes and the difference can be over 10 decibels (dB) (e.g., for band combination n2-n77 due to IMD4 occurring on band n2 downlink). Therefore, the current power class can affect physical downlink shared channel scheduling and carrier aggregation admission control (e.g., whether carrier aggregation is configured). As another example, reasonable configurations of SRS transmit antenna port switching pattern and uplink full power transmission mode depend on the power class of the user equipment. Therefore, user equipment power class fallback to a lower power class can lead to inadequate performance.

In some prior methods, a base station or network may schedule uplink transmission from user equipment based on a conservative time period to avoid power class fallback. For example, the base station or network may schedule the uplink transmission from the user equipment such that the maximum duty cycle is not exceeded for any time period exceeding 10 ms. However, this does not exploit full scheduling flexibility and reduces performance. In other prior methods, user equipment may cause transmission of a report containing a change in power class to a base station or network when power class fallback occurs or when the user equipment returns to a higher power class. However, this after-the-fact reporting does not provide means for the base station or network to avoid power class fallback in the first place. Other prior methods involve the user equipment reporting current power class, uplink duty cycle evaluation start timing, and evaluation period length to a base station or network. However, the timing for the base station to configure user equipment with reporting configuration relies on existing specifications, where the base station or network monitors an uplink duty cycle of user equipment in a conservative ratio considering reported maximum duty cycle capability and/or remaining power. This can cause the base station or network to miss suitable timing to instruct the user equipment to report evaluation period start timing and length. In addition, user equipment vendors may not wish to report the beginning or duration of an evaluation period to a base station or network. Therefore, communicating when power class fallback is likely to occur remains an issue in facilitating network control.

BRIEF SUMMARY

A method, apparatus, and computer program product are disclosed for facilitating network control. By facilitating communications about when power class fallback is likely to occur, uplink transmission can be scheduled based on more accurate information, leading to better performance.

In an example embodiment, a method is provided that comprises receiving a message comprising information about at least one of a first power class or a maximum duty cycle associated with user equipment. The method further comprises determining, based at least on the first power class or the maximum duty cycle, a threshold duty cycle for the user equipment. The method further comprises causing the threshold duty cycle to be transmitted to the user equipment. The method further comprises determining an uplink transmission schedule for the user equipment based at least on the first power class or the maximum duty cycle. The method further comprises receiving, from the user equipment, a report that the threshold duty cycle has been exceeded by the user equipment.

The method of an example embodiment further comprises determining, based at least on the report, whether to modify the uplink transmission schedule.

The method of an example embodiment further comprises determining, based at least on the report, whether the uplink transmission schedule should not be modified.

The method of an example embodiment further comprises receiving, from the user equipment, a second report comprising a second power class and a time estimate of return to the first power class. The method further comprises modifying the uplink transmission schedule based at least on the second report.

The method of an example embodiment further comprises modifying link adaptation based at least on the second report.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, a method is provided that comprises receiving a message comprising information about at least one of a first power class or a maximum duty cycle associated with user equipment. The method further comprises determining, based at least on the first power class or the maximum duty cycle, a repeated report request for the user equipment. The method further comprises causing the repeated report request to be transmitted to the user equipment. The method further comprises determining an uplink transmission schedule for the user equipment based at least on the first power class or the maximum duty cycle. The method further comprises receiving, from the user equipment, at least one report. The method further comprises determining, based on the at least one report, an estimated evaluation period associated with the user equipment.

The method of an example embodiment further comprises modifying the uplink transmission schedule based on the estimated evaluation period.

The method of an example embodiment further comprises determining an accuracy level associated with the estimated evaluation period. The method further comprises determining that the accuracy level satisfies a threshold accuracy level. The method further comprises determining a modified report request based at least on the accuracy level satisfying the threshold accuracy level. The method further comprises causing a modified report request to be transmitted to the user equipment.

In an example embodiment, the modified report request indicates that the user equipment should cease transmission of reports.

In an example embodiment, the at least one report comprises a power headroom report.

The method of an example embodiment further comprises receiving, from the user equipment, an indication of a sliding evaluation period.

The method of an example embodiment further comprises receiving, from the user equipment, an indication of a sequential evaluation period.

In an example embodiment, the at least one report is received after a preconfigured time period based on the evaluation period.

In an example embodiment, a method is provided that comprises causing transmission of a message comprising information about at least one of a first power class or a maximum duty cycle associated with user equipment. The method further comprises receiving, from the base station, a repeated report request. The method further comprises configuring at least one report comprising at least one of a current power class or a percentage of uplink symbols transmitted within an evaluation period. The method further comprises causing transmission, after a preconfigured time period, of the at least one report to the base station. The method further comprises receiving, from the base station, a modified report request.

The method of an example embodiment further comprises configuring at least one updated report comprising at least one of an updated power class or an updated percentage of uplink symbols transmitted within the evaluation period. The method further comprises determining that the at least one updated report satisfies a difference threshold with the at least one report. The method further comprises causing transmission, after the preconfigured time period, of the at least one updated report.

In an example embodiment, the at least one report comprises a power headroom report.

In an example embodiment, the modified report request comprises instructions to cease transmission of reports.

The method of an example embodiment further comprises causing transmission of an indication of a sliding evaluation period to the base station.

The method of an example embodiment further comprises causing transmission of an indication of a sequential evaluation period to the base station.

In an example embodiment, the preconfigured time period is based on the evaluation period.

In an example embodiment, a method is provided that comprises causing transmission of a message comprising information about at least one of a first power class or a maximum duty cycle to a base station. The method further comprises receiving a threshold duty cycle from the base station. The method further comprises determining that the threshold duty cycle has been exceeded. The method further comprises causing transmission of a report that the threshold duty cycle has been exceeded to the base station.

The method of an example embodiment further comprises determining that the maximum duty cycle has been exceeded. The method further comprises determining a time estimate of return to the first power class. The method further comprises configuring a second report comprising a second power class and the time estimate of return to the first power class. The method further comprises causing transmission of the second report to the base station.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, the report is transmitted after a preconfigured time period.

In an example embodiment, an apparatus is provided that comprises at least one processor and at least one memory including computer program code with the at least one memory and the computer program code configured to, with the at least one processor, cause the apparatus at least to receive a message comprising information about at least one of a first power class or a maximum duty cycle associated with user equipment. The at least one memory and the computer program code are further configured to, with the at least one processor, cause the apparatus to determine, based at least on the first power class or the maximum duty cycle, a threshold duty cycle for the user equipment. The at least one memory and the computer program code are further configured to, with the at least one processor, cause the apparatus to cause the threshold duty cycle to be transmitted to the user equipment. The at least one memory and the computer program code are further configured to, with the at least one processor, cause the apparatus to determine an uplink transmission schedule for the user equipment based at least on the first power class or the maximum duty cycle. The at least one memory and the computer program code are further configured to, with the at least one processor, cause the apparatus to receive, from the user equipment, a report that the threshold duty cycle has been exceeded by the user equipment.

In an example embodiment, the at least one memory and the computer program code are further configured to, with the at least one processor, cause the apparatus to determine, based at least on the report, whether to modify the uplink transmission schedule.

In an example embodiment, the at least one memory and the computer program code are further configured to, with the at least one processor, cause the apparatus to determine, based at least on the report, whether the uplink transmission schedule should not be modified.

In an example embodiment, the at least one memory and the computer program code are further configured to, with the at least once processor, cause the apparatus to receive, from the user equipment, a second report comprising a second power class and a time estimate of return to the first power class. The at least one memory and the computer program code are further configured to, with the at least one processor, cause the apparatus to modify the uplink transmission schedule based at least on the second report.

In an example embodiment, the at least one memory and the computer program code are further configured to, with the at least one processor, cause the apparatus to modify link adaptation based at least on the second report.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, an apparatus is provided that comprises at least one processor and at least one memory including computer program code with the at least one memory and the computer program code further configured to, with the at least one processor, cause the apparatus at least to receive a message comprising information about at least one of a first power class or a maximum duty cycle associated with user equipment. The at least one memory and the computer program code are further configured to, with the at least one processor, cause the apparatus to determine, based at least on the first power class or the maximum duty cycle, a repeated report request for the user equipment. The at least one memory and the computer program code are further configured to, with the at least one processor, cause the apparatus to cause the repeated report request to be transmitted to the user equipment. The at least one memory and the computer program code are further configured to, with the at least one processor, cause the apparatus to determine an uplink transmission schedule for the user equipment based at least on the first power class or the maximum duty cycle. The at least one memory and the computer program code are further configured to, with the at least one processor, cause the apparatus to receive, from the user equipment, at least one report. The at least one memory and the computer program code are further configured to, with the at least one processor, cause the apparatus to determine, based on the at least one report, an estimated evaluation period associated with the user equipment.

In an example embodiment, the at least one memory and the computer program code are further configured to, with the at least one processor, cause the apparatus to modify the uplink transmission schedule based on the estimated evaluation period.

In an example embodiment, the at least one memory and the computer program code are further configured to, with the at least one processor, cause the apparatus to determine an accuracy level associated with the estimated evaluation period. The at least one memory and the computer program code are further configured to, with the at least one processor, cause the apparatus to determine that the accuracy level satisfies a threshold accuracy level. The at least one memory and the computer program code are further configured to, with the at least one processor, cause the apparatus to determine a modified report request based at least on the accuracy level satisfying the threshold accuracy level. The at least one memory and the computer program code are further configured to, with the at least one processor, cause the apparatus to cause a modified report request to be transmitted to the user equipment.

In an example embodiment, the modified report request indicates that the user equipment should cease transmission of reports.

In an example embodiment, the at least one report comprises a power headroom report.

In an example embodiment, the at least one memory and the computer program code are further configured to, with the at least one processor, cause the apparatus to receive, from the user equipment, an indication of a sliding evaluation period.

In an example embodiment, the at least one memory and the computer program code are further configured to, with the at least one processor, cause the apparatus to receive, from the user equipment, an indication of a sequential evaluation period.

In an example embodiment, the at least one report is received after a preconfigured time period based on the evaluation period.

In an example embodiment, an apparatus is provided that comprises at least one processor and at least one memory including computer program code with the at least one memory and the computer program code configured to, with the at least one processor, cause the apparatus at least to cause transmission of a message comprising information about at least one of a first power class or a maximum duty cycle associated with user equipment. The at least one memory and the computer program code are further configured to, with the at least one processor, cause the apparatus to receive, from the base station, a repeated report request. The at least one memory and the computer program code are further configured to, with the at least one processor, cause the apparatus to configure at least one report comprising at least one of a current power class or a percentage of uplink symbols transmitted within an evaluation period. The at least one memory and the computer program code are further configured to, with the at least one processor, cause the apparatus to cause transmission, after a preconfigured time period, of the at least one report to the base station. The at least one memory and the computer program code are further configured to, with the at least one processor, cause the apparatus to receive, from the base station, a modified report request.

In an example embodiment, the at least one memory and the computer program code are further configured to, with the at least one processor, cause the apparatus to configure at least one updated report comprising at least one of an updated power class or an updated percentage of uplink symbols transmitted within the evaluation period. The at least one memory and the computer program code are further configured to, with the at least one processor, cause the apparatus to determine that the at least one updated report satisfies a difference threshold with the at least one report. The at least one memory and the computer program code are further configured to, with the at least one processor, cause the apparatus to cause transmission, after the preconfigured time period, of the at least one updated report.

In an example embodiment, the at least one report comprises a power headroom report.

In an example embodiment, the modified report request comprises instructions to cease transmission of reports.

In an example embodiment, the at least one memory and the computer program code are further configured to, with the at least one processor, cause the apparatus to cause transmission of an indication of a sliding evaluation period to the base station.

In an example embodiment, the at least one memory and the computer program code are further configured to, with the at least one processor, cause the apparatus to cause transmission of an indication of a sequential evaluation period to the base station.

In an example embodiment, the preconfigured time period is based on the evaluation period.

In an example embodiment, an apparatus is provided that comprises at least one processor and at least one memory including computer program code with the at least one memory and the computer program code configured to, with the at least one processor, cause the apparatus at least to cause transmission of a message comprising information about at least one of a first power class or a maximum duty cycle to a base station. The at least one memory and the computer program code are further configured to, with the at least one processor, cause the apparatus to receive a threshold duty cycle from the base station. The at least one memory and the computer program code are further configured to, with the at least one processor, cause the apparatus to determine that the threshold duty cycle has been exceeded. The at least one memory and the computer program code are further configured to, with the at least one processor, cause the apparatus to cause transmission of a report that the threshold duty cycle has been exceeded to the base station.

In an example embodiment, the at least one memory and the computer program code are further configured to, with the at least one processor, cause the apparatus to determine that the maximum duty cycle has been exceeded. The at least one memory and the computer program code are further configured to, with the at least one processor, cause the apparatus to determine a time estimate of return to the first power class. The at least one memory and the computer program code are further configured to, with the at least one processor, cause the apparatus to configure a second report comprising a second power class and the time estimate of return to the first power class. The at least one memory and the computer program code are further configured to, with the at least one processor, cause the apparatus to cause transmission of the second report to the base station.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, the report is transmitted after a preconfigured time period.

In an example embodiment, a non-transitory computer readable storage medium is provided comprising computer instructions that, when executed by an apparatus, cause the apparatus to receive a message comprising information about at least one of a first power class or a maximum duty cycle associated with user equipment. The non-transitory computer readable storage medium further includes computer instructions configured, upon execution, to determine, based at least on the first power class or the maximum duty cycle, a threshold duty cycle for the user equipment. The non-transitory computer readable storage medium further includes computer instructions configured, upon execution, to cause the threshold duty cycle to be transmitted to the user equipment. The non-transitory computer readable storage medium further includes computer instructions configured, upon execution, to determine an uplink transmission schedule for the user equipment based at least on the first power class or the maximum duty cycle. The non-transitory computer readable storage medium further includes computer instructions configured, upon execution, to receive, from the user equipment, a report that the threshold duty cycle has been exceeded by the user equipment.

The non-transitory computer readable storage medium of an example embodiment further includes computer instructions configured to, upon execution, determine, based at least on the report, whether to modify the uplink transmission schedule.

The non-transitory computer readable storage medium of an example embodiment further includes computer instructions configured, upon execution, to determine, based at least on the report, whether the uplink transmission schedule should not be modified.

The non-transitory computer readable storage medium of an example embodiment further includes computer instructions configured, upon execution, to receive, from the user equipment, a second report comprising a second power class and a time estimate of return to the first power class. The non-transitory computer readable storage medium further includes computer instructions configured, upon execution, to modify the uplink transmission schedule based at least on the second report.

The non-transitory computer readable storage medium of an example embodiment further includes computer instructions configured, upon execution, to modify link adaptation based at least on the second report.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, a non-transitory computer readable storage medium is provided comprising computer instructions that, when executed by an apparatus, cause the apparatus to receive a message comprising information about at least one of a first power class or a maximum duty cycle associated with user equipment. The non-transitory computer readable storage medium further includes computer instructions configured, upon execution, to determine, based at least on the first power class or the maximum duty cycle, a repeated report request for the user equipment. The non-transitory computer readable storage medium further includes computer instructions configured, upon execution, to cause the repeated report request to be transmitted to the user equipment. The non-transitory computer readable storage medium further includes computer instructions configured, upon execution, to determine an uplink transmission schedule for the user equipment based at least on the first power class or the maximum duty cycle. The non-transitory computer readable storage medium further includes computer instructions configured, upon execution, to receive, from the user equipment, at least one report.

The non-transitory computer readable storage medium further includes computer instructions configured, upon execution, to determine, based on the at least one report, an estimated evaluation period associated with the user equipment.

The non-transitory computer readable storage medium of an example embodiment further includes computer instructions configured, upon execution, to modify the uplink transmission schedule based on the estimated evaluation period.

The non-transitory computer readable storage medium of an example embodiment further includes computer instructions configured, upon execution, to determine an accuracy level associated with the estimated evaluation period. The non-transitory computer readable storage medium further includes computer instructions configured, upon execution, to determine that the accuracy level satisfies a threshold accuracy level. The non-transitory computer readable storage medium further includes computer instructions configured, upon execution, to determine a modified report request based at least on the accuracy level satisfying the threshold accuracy level. The non-transitory computer readable storage medium further includes computer instructions configured, upon execution, to cause a modified report request to be transmitted to the user equipment.

In an example embodiment, the modified report request indicates that the user equipment should cease transmission of reports.

In an example embodiment, the at least one report comprises a power headroom report.

The non-transitory computer readable storage medium of an example embodiment further includes computer instructions configured, upon execution, to receive, from the user equipment, an indication of a sliding evaluation period.

The non-transitory computer readable storage medium of an example embodiment further includes computer instructions configured, upon execution, to receive, from the user equipment, an indication of a sequential evaluation period.

In an example embodiment, the at least one report is received after a preconfigured time period based on the evaluation period.

In an example embodiment, a non-transitory computer-readable storage medium is provided comprising computer instructions that, when executed by an apparatus, cause the apparatus to cause transmission of a message comprising information about at least one of a first power class or a maximum duty cycle associated with user equipment. The non-transitory computer readable storage medium further includes computer instructions configured, upon execution, to receive, from the base station, a repeated report request. The non-transitory computer readable storage medium further includes computer instructions configured, upon execution, to configure at least one report comprising at least one of a current power class or a percentage of uplink symbols transmitted within an evaluation period. The non-transitory computer readable storage medium further includes computer instructions configured, upon execution, to cause transmission, after a preconfigured time period, of the at least one report to the base station. The non-transitory computer readable storage medium further includes computer instructions configured, upon execution, to receive, from the base station, a modified report request.

The non-transitory computer readable storage of an example embodiment medium further includes computer instructions configured, upon execution, to configure at least one updated report comprising at least one of an updated power class or an updated percentage of uplink symbols transmitted within the evaluation period. The non-transitory computer readable storage medium further includes computer instructions configured, upon execution, to determine that the at least one updated report satisfies a difference threshold with the at least one report. The non-transitory computer readable storage medium further includes computer instructions configured, upon execution, to cause transmission, after the preconfigured time period, of the at least one updated report.

In an example embodiment, the at least one report comprises a power headroom report.

In an example embodiment, the modified report request comprises instructions to cease transmission of reports.

The non-transitory computer readable storage medium of an example embodiment further includes computer instructions configured, upon execution, to cause transmission of an indication of a sliding evaluation period to the base station.

The non-transitory computer readable storage medium of an example embodiment further includes computer instructions configured, upon execution, to cause transmission of an indication of a sequential evaluation period to the base station.

In an example embodiment, the preconfigured time period is based on the evaluation period.

In an example embodiment, a non-transitory computer readable storage medium is provided comprising computer instructions that, when executed by an apparatus, cause the apparatus to cause transmission of a message comprising information about at least one of a first power class or a maximum duty cycle to a base station. The non-transitory computer readable storage medium further includes computer instructions configured, upon execution, to receive a threshold duty cycle from the base station. The non-transitory computer readable storage medium further includes computer instructions configured, upon execution, to determine that the threshold duty cycle has been exceeded. The non-transitory computer readable storage medium further includes computer instructions configured, upon execution, to cause transmission of a report that the threshold duty cycle has been exceeded to the base station.

The non-transitory computer readable storage medium of an example embodiment further includes computer instructions configured, upon execution, to determine that the maximum duty cycle has been exceeded. The non-transitory computer readable storage medium further includes computer instructions configured, upon execution, to determine a time estimate of return to the first power class. The non-transitory computer readable storage medium further includes computer instructions configured, upon execution, to configure a second report comprising a second power class and the time estimate of return to the first power class. The non-transitory computer readable storage medium further includes computer instructions configured, upon execution, to cause transmission of the second report to the base station.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, the report is transmitted after a preconfigured time period.

In an example embodiment, an apparatus is provided that comprises means for receiving a message comprising information about at least one of a first power class or a maximum duty cycle associated with user equipment. The apparatus further comprises means for determining, based at least on the first power class or the maximum duty cycle, a threshold duty cycle for the user equipment. The apparatus further comprises means for causing the threshold duty cycle to be transmitted to the user equipment. The apparatus further comprises means for determining an uplink transmission schedule for the user equipment based at least on the first power class or the maximum duty cycle. The apparatus further comprises means for receiving, from the user equipment, a report that the threshold duty cycle has been exceeded by the user equipment.

The apparatus of an example embodiment further comprises means for determining, based at least on the report, whether to modify the uplink transmission schedule.

The apparatus of an example embodiment further comprises means for determining, based at least on the report, whether the uplink transmission schedule should not be modified.

The apparatus of an example embodiment further comprises means for receiving, from the user equipment, a second report comprising a second power class and a time estimate of return to the first power class. The apparatus further comprises means for modifying the uplink transmission schedule based at least on the second report.

The apparatus of an example embodiment further comprises means for modifying link adaptation based at least on the second report.

In an example embodiment, the threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, an apparatus is provided that comprises means for receiving a message comprising information about at least one of a first power class or a maximum duty cycle associated with user equipment. The apparatus further comprises means for determining, based at least on the first power class or the maximum duty cycle, a repeated report request for the user equipment. The apparatus further comprises means for causing the repeated report request to be transmitted to the user equipment. The apparatus further comprises means for determining an uplink transmission schedule for the user equipment based at least on the first power class or the maximum duty cycle. The apparatus further comprises means for receiving, from the user equipment, at least one report. The apparatus further comprises means for determining, based on the at least one report, an estimated evaluation period associated with the user equipment.

The apparatus of an example embodiment further comprises means for modifying the uplink transmission schedule based on the estimated evaluation period. The apparatus further comprises means for determining an accuracy level associated with the estimated evaluation period. The apparatus further comprises means for determining that the accuracy level satisfies a threshold accuracy level. The apparatus further comprises means for determining a modified report request based at least on the accuracy level satisfying the threshold accuracy level. The apparatus further comprises means for causing a modified report request to be transmitted to the user equipment.

In an example embodiment, the modified report request indicates that the user equipment should cease transmission of reports.

In an example embodiment, the at least one report comprises a power headroom report.

The apparatus of an example embodiment further comprises means for receiving, from the user equipment, an indication of a sliding evaluation period.

The apparatus of an example embodiment further comprises means for receiving, from the user equipment, an indication of a sequential evaluation period.

In an example embodiment, the at least one report is received after a preconfigured time period based on the evaluation period.

In an example embodiment, an apparatus is provided that comprises means for causing transmission of a message comprising information about at least one of a first power class or a maximum duty cycle associated with user equipment. The apparatus further comprises means for receiving, from the base station, a repeated report request. The apparatus further comprises means for configuring at least one report comprising at least one of a current power class or a percentage of uplink symbols transmitted within an evaluation period. The apparatus further comprises means for causing transmission, after a preconfigured time period, of the at least one report to the base station. The apparatus further comprises means for receiving, from the base station, a modified report request.

The apparatus of an example embodiment further comprises means for configuring at least one updated report comprising at least one of an updated power class or an updated percentage of uplink symbols transmitted within the evaluation period. The apparatus further comprises means for determining that the at least one updated report satisfies a difference threshold with the at least one report. The apparatus further comprises means for causing transmission, after the preconfigured time period, of the at least one updated report.

In an example embodiment, the at least one report comprises a power headroom report.

In an example embodiment, the modified report request comprises instructions to cease transmission of reports.

The apparatus of an example embodiment further comprises means for causing transmission of an indication of a sliding evaluation period to the base station.

The apparatus of an example embodiment further comprises means for causing transmission of an indication of a sequential evaluation period to the base station.

In an example embodiment, the preconfigured time period is based on the evaluation period.

In an example embodiment, an apparatus is provided that comprises means for causing transmission of a message comprising information about at least one of a first power class or a maximum duty cycle to a base station. The apparatus further comprises means for receiving a threshold duty cycle from the base station. The apparatus further comprises means for determining that the threshold duty cycle has been exceeded. The apparatus further comprises means for causing transmission of a report that the threshold duty cycle has been exceeded to the base station.

The apparatus of an example embodiment further comprises means for determining that the maximum duty cycle has been exceeded. The apparatus further comprises means for determining a time estimate of return to the first power class. The apparatus further comprises means for configuring a second report comprising a second power class and the time estimate of return to the first power class. The apparatus further comprises means for causing transmission of the second report to the base station.

In an example embodiment, threshold duty cycle comprises a transmitted uplink symbol percentage value.

In an example embodiment, the threshold duty cycle comprises a portion of the maximum duty cycle.

In an example embodiment, the report comprises a power headroom report.

In an example embodiment, the report is transmitted after a preconfigured time period.

BRIEF DESCRIPTION OF THE DRAWINGS

Figure 1:
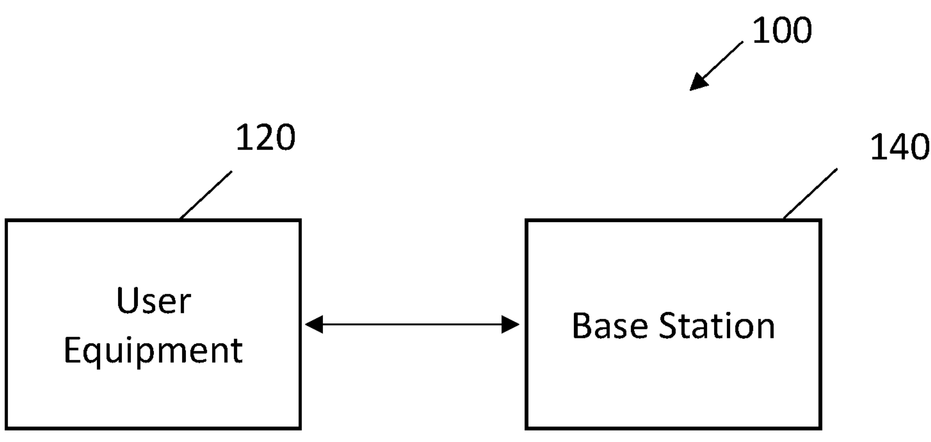
Figure 2:
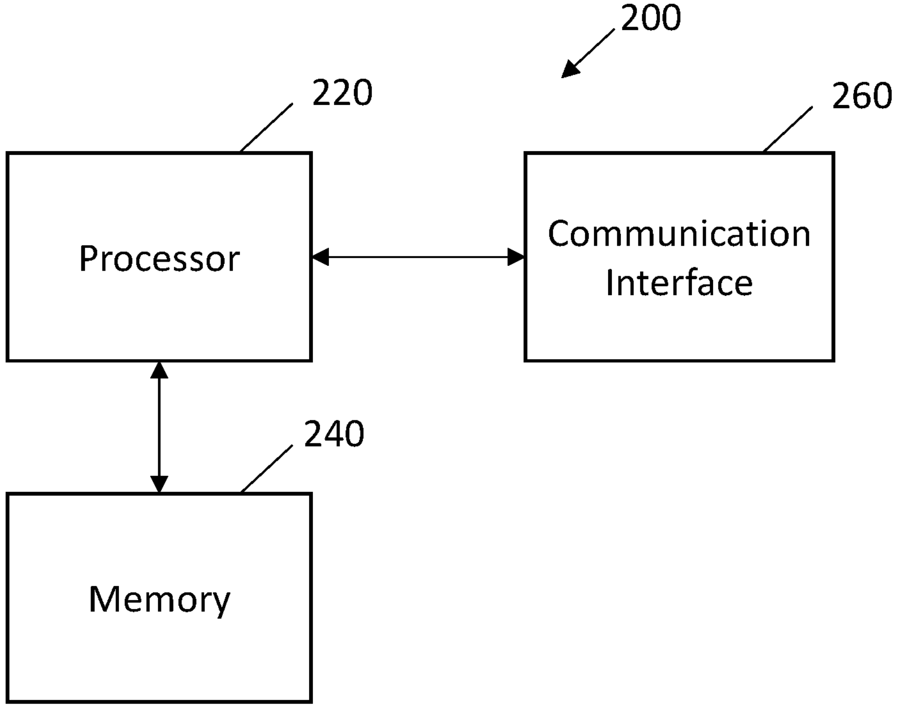
Figure 3:
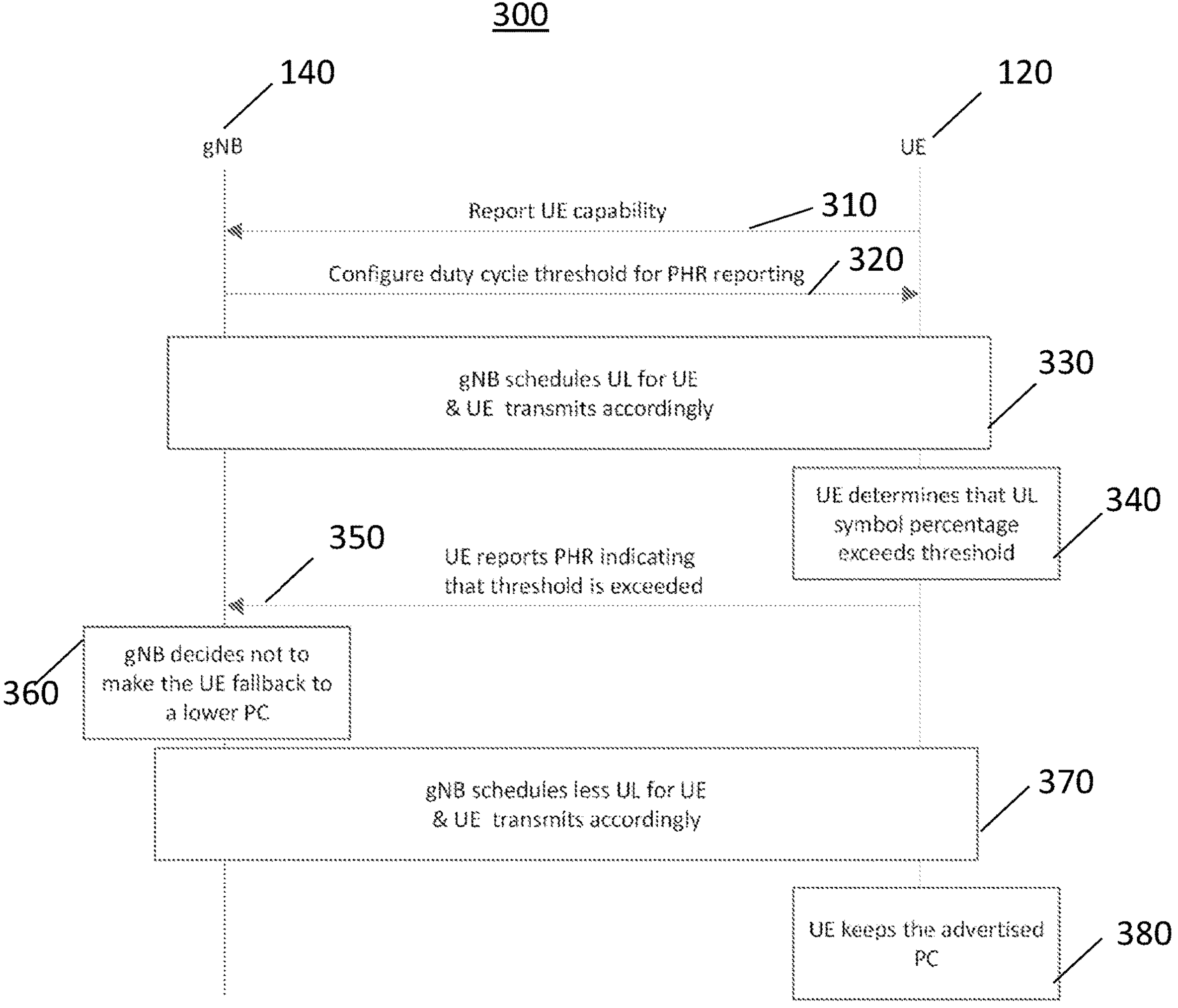
Figure 4:
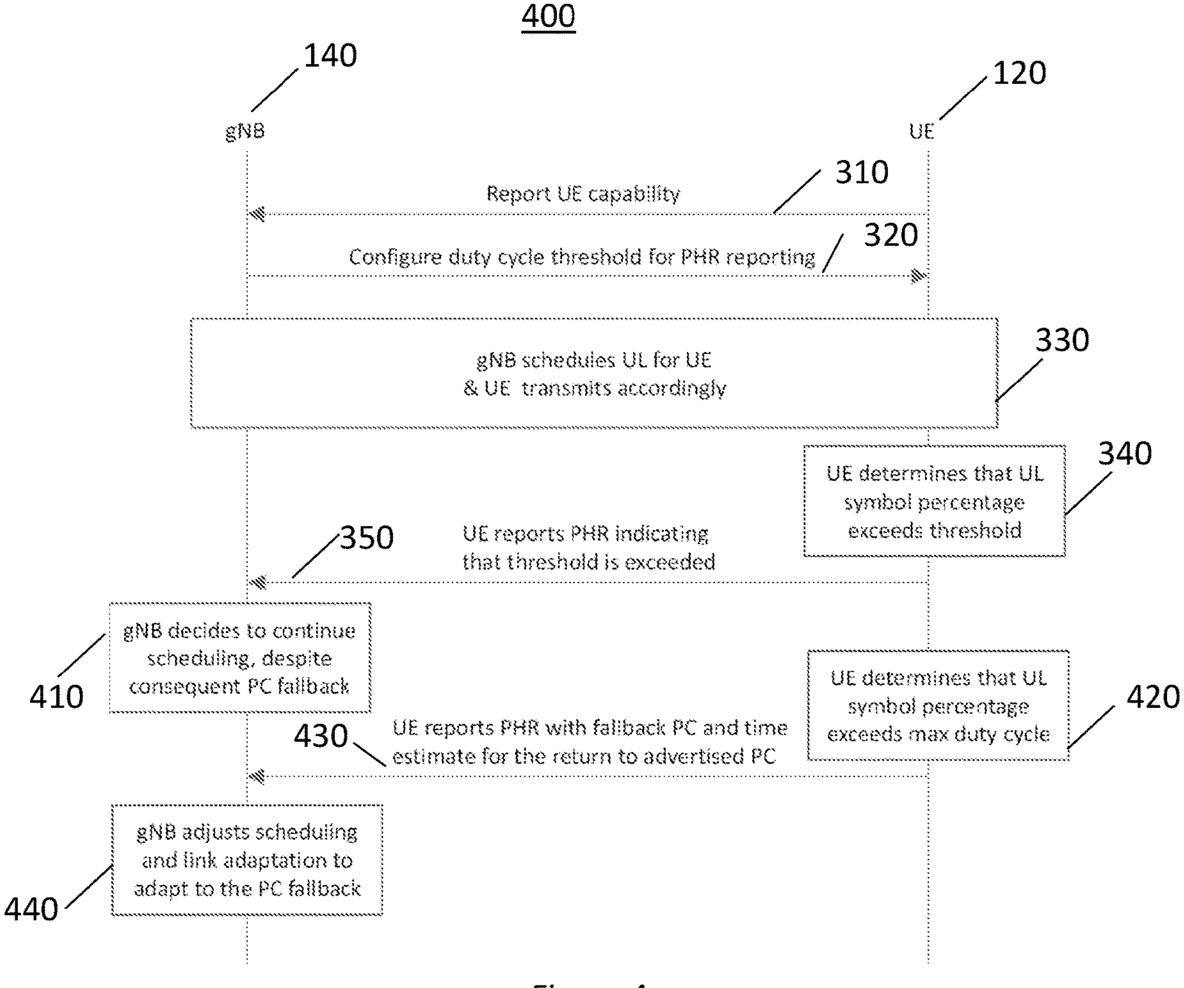
Figure 5:
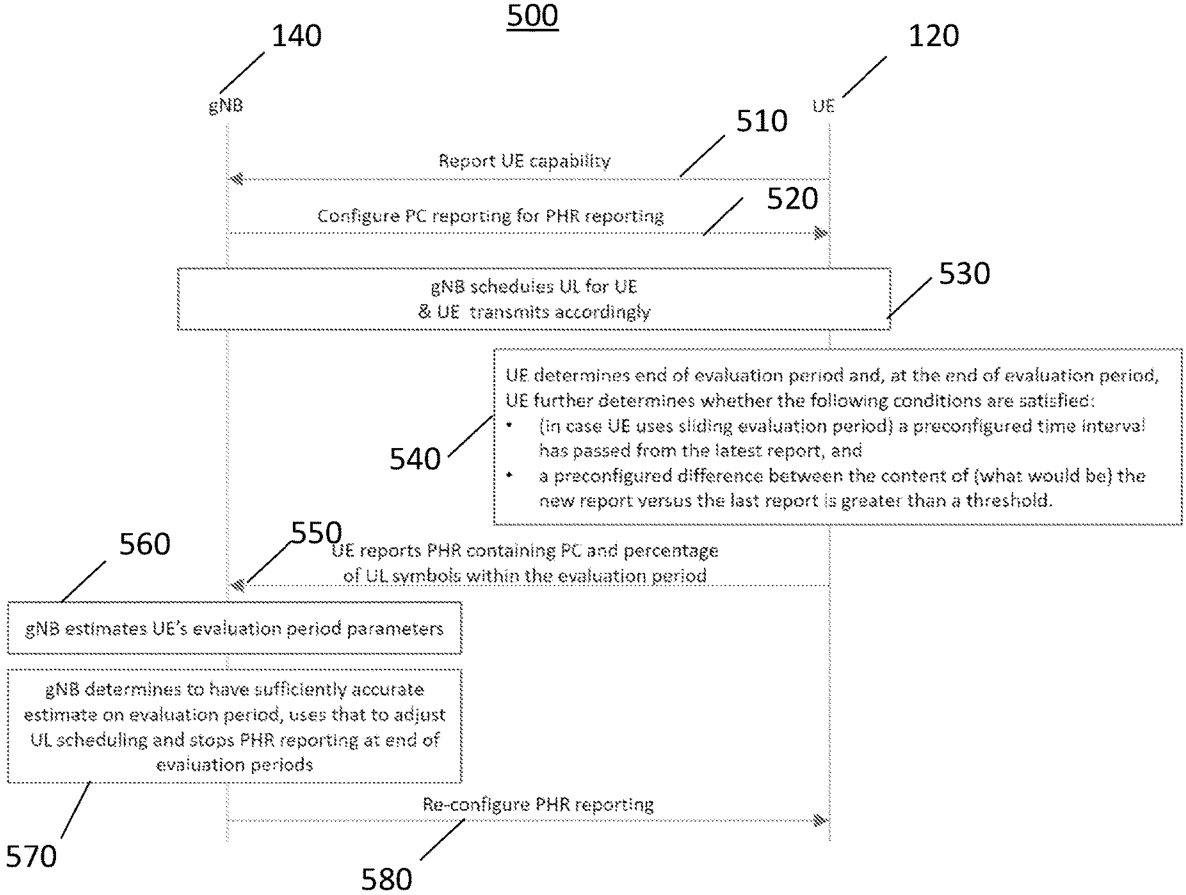
Figure 6:
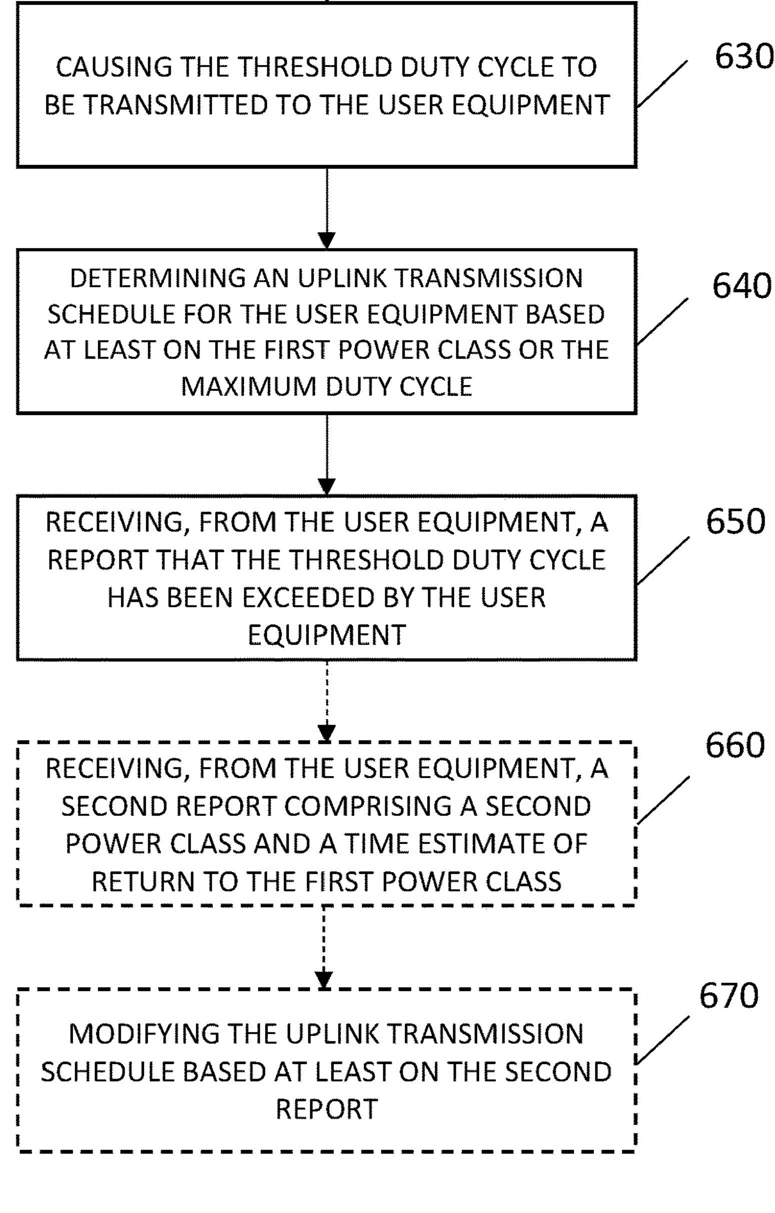
Figure 7:
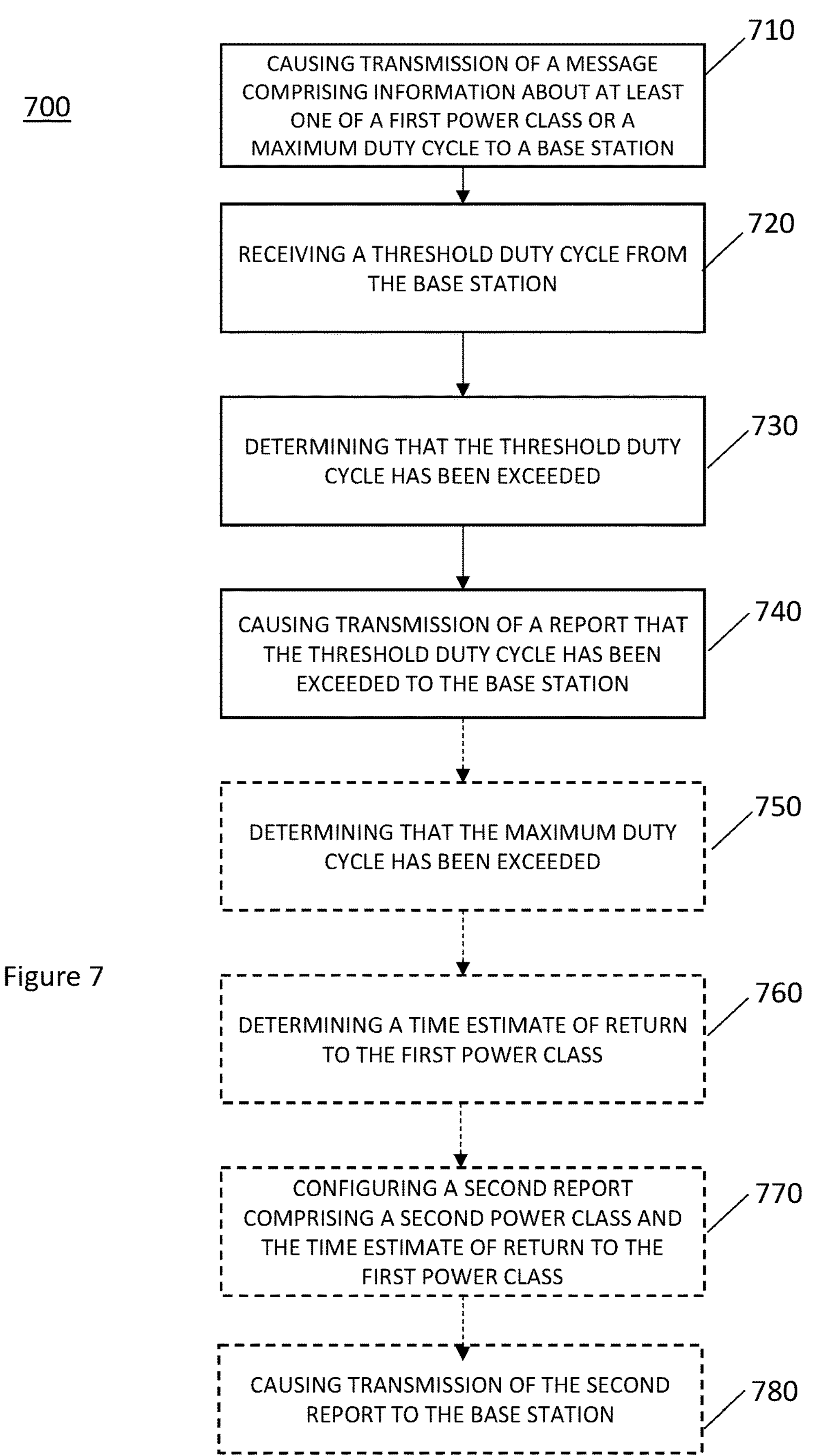
Figure 8:
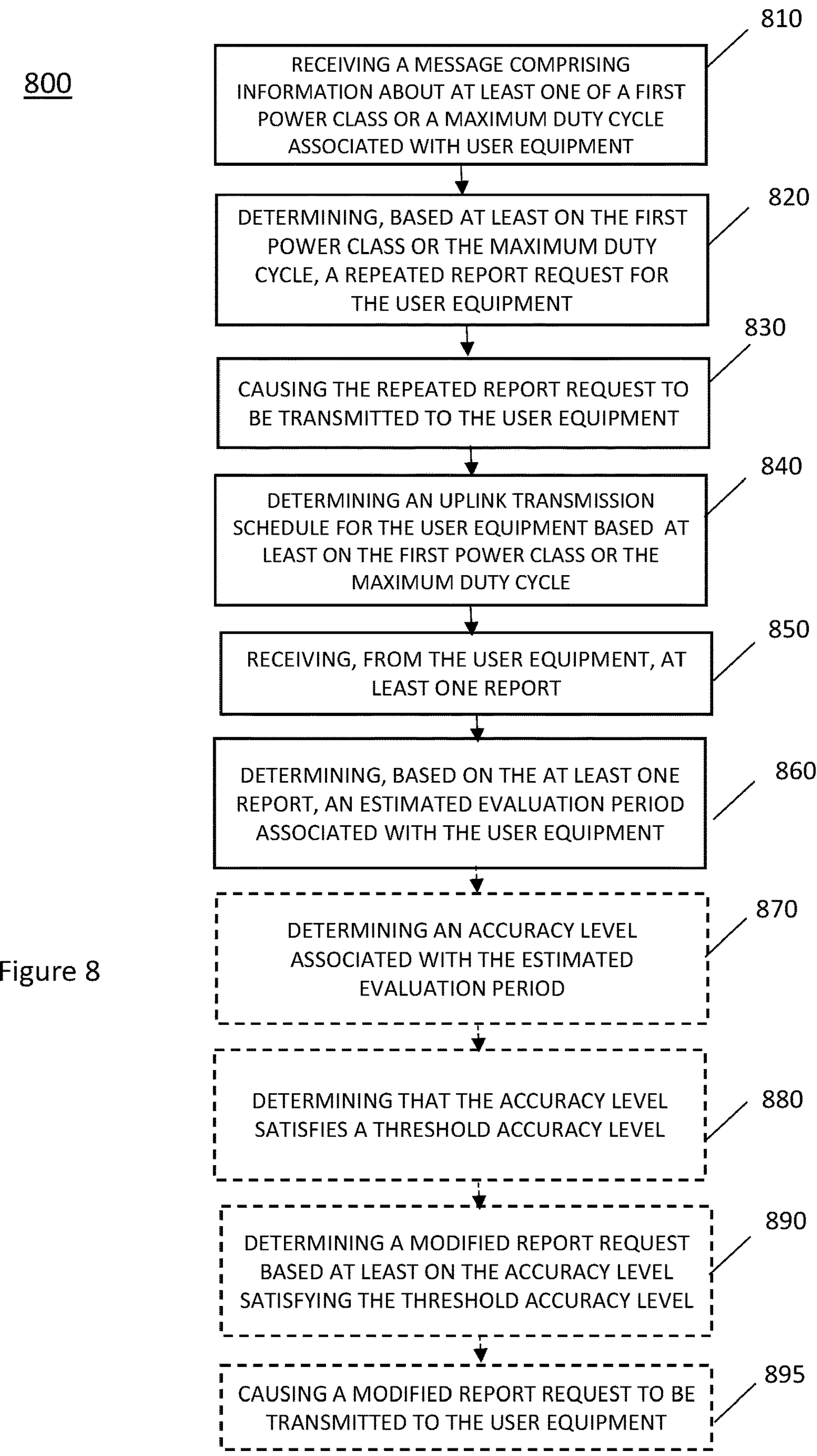
Figure 9:
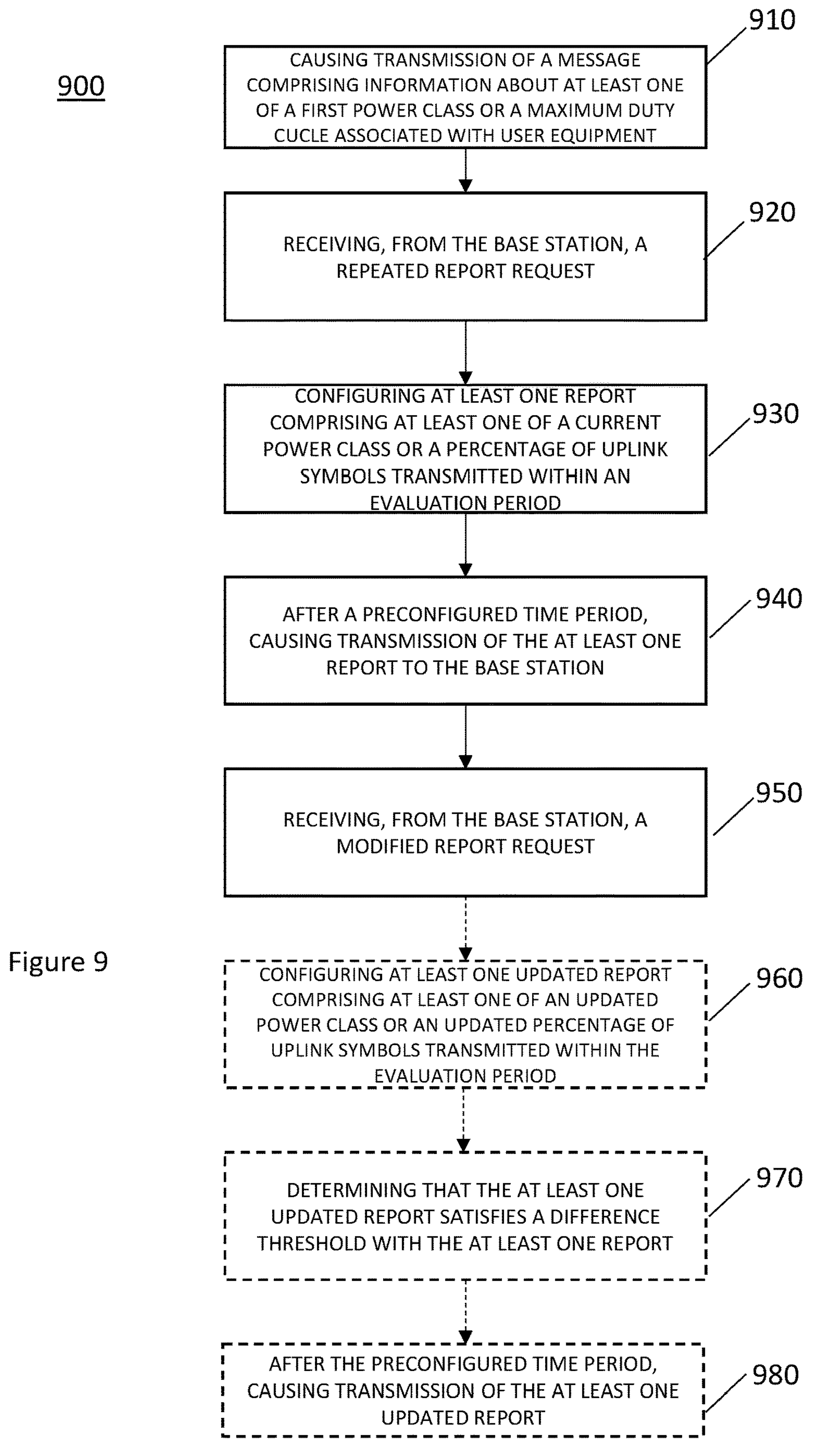

Having thus described certain example embodiments of the present disclosure in general terms, reference will hereinafter be made to the accompanying drawings, which are not necessarily drawn to scale, and wherein:

FIG. 1 is a block diagram of a system including both a base station and user equipment configured to communicate via at least uplink and downlink transmission in accordance with an example embodiment of the present disclosure;

FIG. 2 is a block diagram of an example communication system in which the system of FIG. 1 may be deployed in accordance with an example embodiment of the present disclosure;

FIG. 3 is a flow diagram demonstrating the operations performed, such as by the apparatus of FIG. 2, in order to adjust uplink transmission in response to user equipment exceeding a threshold duty cycle in accordance with an example embodiment of the present disclosure;

FIG. 4 is a flow diagram demonstrating the operations performed, such as by the apparatus of FIG. 2, in order to adjust uplink transmission in response to a user equipment power class fallback in accordance with an example embodiment of the present disclosure;

FIG. 5 is a flow diagram demonstrating the operations performed, such as by the apparatus of FIG. 2, in order for a base station to accurately estimate an evaluation period associated with user equipment in accordance with an example embodiment of the present disclosure;

FIG. 6 is a flowchart demonstrating the operations performed, such as by the apparatus of FIG. 2, in order to receive, from user equipment, a report that a threshold duty cycle has been exceeded by the user equipment in accordance with an example embodiment of the present disclosure;

FIG. 7 is a flowchart demonstrating the operations performed, such as by the apparatus of FIG. 2, in order to cause transmission of a report to a base station that a threshold duty cycle has been exceeded in accordance with an example embodiment of the present disclosure;

FIG. 8 is a flowchart demonstrating the operations performed, such as by the apparatus of FIG. 2, in order to determine, based on at least one report received from user equipment, an estimated evaluation period associated with the user equipment in accordance with an example embodiment of the present disclosure; and FIG. 9 is a flowchart demonstrating the operations performed, such as by the apparatus of FIG. 2, in order to receive a modified report request from a base station in accordance with an example embodiment of the present disclosure.

DETAILED DESCRIPTION

Some embodiments of the present disclosure will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As used herein, the term "computer-readable medium" refers to non-transitory storage hardware, non-transitory storage device or non-transitory computer system memory that may be accessed by a controller, a microcontroller, a computational system or a module of a computational system to encored thereon computer-executable instructions or software programs. A non-transitory "computer readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more universal synchronous bus (USB) flash drives), computer system memory or random-access memory (such as dynamic random access memory (DRAM), static random access memory (SRAM), extended data out random access memory (EDO RAM), and the like.

As illustrated in FIG. 1, a system 100 is provided in accordance with an example embodiment in order to facilitate uplink transmission from user equipment 120. Although the system may be configured in various manners, the system of one embodiment is depicted in FIG. 1 and includes both user equipment 120 and base station 140 configured to communicate via uplink and downlink transmission and reception beams. Although one user equipment and one base station is depicted, the system may include and the user equipment 120 and/or base station 140 may communicate with additional user equipment and base stations in other embodiments. In one or more embodiments, the user equipment 120 and base station 140 may configured to support, for example, 5G, 5G advanced, or 6G. In one or more embodiments, the system 100 may support carrier aggregation and/or dual connectivity. As described below, the system is configured to transmit messages and reports, such as power headroom reporting (PHR), comprising information about power classes and duty cycles in order to facilitate scheduling of uplink transmissions.

The data that is transmitted via the uplink and downlink beams between the user equipment 120 and the base station 140 can be any of a wide variety of data including, but not limited to digital imagery data including video data, audio data as well as data provided by sensors, radars, telescopes and radio receivers. In at least some instances, the data is encoded prior to communication of the data via the uplink and downlink beams and decoded upon reception. The resulting data received may be utilized for a variety of purposes including presentation to a user, storage of the data for subsequent use and/or provision of the data to one or more applications, such as applications that perform statistical inference on the data for various purposes including object recognition, image classification, spectrum sensing, speech transcription and/or prediction or detection of events.

The user equipment 120 of FIG. 1 (also called UE, user device, user terminal, terminal device, etc.) illustrated one type of an apparatus which resources on an air interface are allocated and assigned. The user equipment 120 typically refers to a portable computing device that includes wireless mobile communication devices operating with or without a subscriber identification module (SIM), including, but not limited to, the following types of devices: a mobile station (mobile phone), smartphone, personal digital assistance (PDA), handset, device using a wireless modem (alarm or measurement device, etc.), laptop and/or touch screen computer, tablet, game console, notebook, and multimedia device. User equipment 120 may also be a device having capability to operate in Internet of Things (IoT) network which is a scenario in which objects are provided with the ability to transfer data over a network without requiring human-to-human or human-to-computer interaction. The user equipment 120 (or in some embodiments a layer 3 relay node) is configured to perform one or more of user equipment functionalities. The user equipment 120 may also be called a subscriber unit, mobile station, remote terminal, access terminal, user terminal, or user equipment (UE) just to mention but a few names or apparatuses In one or more embodiments, the user equipment 120 may support one or more power classes. It should be noted that throughout this disclosure, the term "power class" may be used to refer to a power class state supported by user equipment. For example and without limitation, in carrier aggregation or dual connectivity, the user equipment 120 may support power class 3 (23 dBm) in one band and power class 2 (26 dBm) in another band. In one or more embodiments, the user equipment 120 may have maximum output power capability HigherPowerLimitCADC, using full power from multiple power amplifiers to operate with maximum composite power. For example and without limitation, a user equipment 120 that supports power class 3 in one band and power class 2 in another band may operate with maximum composite power of 27.8 dBm. In one or more embodiments, a user equipment 120 operating in inter-band carrier aggregation without maximum output power capability HigherPowerLimitCADC may set its total configured maximum power output $P_{CMAX}$ between upper and lower bounds given by equations $P_{CMAX\_L}=\text{MIN}\ \{10\log_{10}\Sigma\text{MIN}\ [p_{EMAX,c}/(Dt_{C,c}),\ p_{PowerClass,c}/(\text{MAX}\ (mpr_c\cdot\Delta mpr_c,\ a\text{-}mpr_c)\cdot Dt_{C,c}\cdot Dt_{IB,c}\cdot Dt_{RxSRS,c}),\ p_{PowerClass,c}/pmpr_c],\ P_{EMAX,CA},\ P_{PowerClass,CA}-\Delta P_{PowerClass,\ CA}\}$ and $P_{CMAX\_H}=\text{MIN}\ \{10\log_{10}\Sigma p_{EMAX,c},\ P_{EMAX,CA},\ P_{PowerClass,CA}-\Delta P_{PowerClass,\ CA}\}$ respectively. In one or more embodiments, a user equipment 120 operating in inter-band carrier aggregation with maximum output power capability HigherPowerLimitCADC and $\Delta P_{PowerClass,\ CA}=0$, the higher and lower limit of the total configured maximum power may be given by the equations $P_{CMAX\_L}=\text{MIN}\ \{10\log_{10}\Sigma\text{MIN}\ [p_{EMAX,c}/(Dt_{C,c}),\ p_{PowerClass,c}/(\text{MAX}\ (mpr_c\cdot\Delta mpr_c,\ a\text{-}mpr_c)\cdot Dt_{C,c}\cdot Dt_{IB,c}\cdot Dt_{RxSRS,c}),\ p_{PowerClass,c}/pmpr_c],\ P_{EMAX,CA},\ P_{PowerClass,CA}-10\log_{10}\Sigma p_{PowerClass,c}\}$ and $P_{CMAX\_H}=\text{MIN}\ \{10\log_{10}\Sigma p_{EMAX,c},\ P_{EMAX,CA},\ P_{PowerClass,CA}-10\log_{10}\Sigma p_{PowerClass,c}\}$ respectively. In one or more embodiments, user equipment 120 may configure its total maximum power output $P_{CMAX}$ as long as it is between the upper and lower limits. In one or more embodiments, the upper and lower limits may be lowered by $\Delta P_{PowerClass,\ CA}$ when a maximum duty cycle is exceeded. For example and without limitation, the upper and lower limits may fall back by 3 dB when the maximum duty cycle is exceeded.

In one or more embodiments, the user equipment 120 may communicate a maximum duty cycle maxUplinkDutyCycle-interBandCA-PC2 to the base station 140. In one or more embodiments, a maximum duty cycle is based on an amount of percentage of transmitted uplink symbols out of a total number of symbols within an evaluation period. In one or more embodiments, the user equipment 120 transmits a message to base station 140 with information about a maximum duty cycle comprising a maximum average percentage of actually transmitted uplink symbols that can be scheduled or used for uplink transmissions during a certain evaluation period. In one or more embodiments, the maximum duty cycle comprises a maximum average percentage of actually transmitted uplink symbols that can be scheduled or used for uplink transmissions during a certain evaluation period to ensure specific absorption rate requirements while user equipment is operating on a power class larger than the default power class for the band. In one or more embodiments, user equipment 120 may operate with a particular power class or power class state as long as the percentage of transmitted uplink symbols does not exceed maxUplinkDutyCycle-interBandCA-PC2 during a particular evaluation period. In one or more embodiments, user equipment 120 may exceed the maximum duty cycle and as a consequence the user equipment 120 has to apply change. In one or more embodiments, user equipment 120 may fall back to a lower power class or power class state as a consequence of exceeding the maximum duty cycle. For example and without limitation, user equipment 120 may fall back from power class 2 (26 dBm) to power class 3 (23 dBm).

In one or more embodiments, the average percentage of actually transmitted uplink symbols in inter-band carrier aggregation by user equipment 120 with maximum duty cycle maxUplinkDutyCycle-interBandCA-PC2 is defined as $(Duty_{NR,x}/maxDuty_{NR,x}+Duty_{NR,y}/maxDuty_{NR,y})/2$, wherein $Duty_{NR,x}/maxDuty_{NR,x}$ and $Duty_{NR,y}/maxDuty_{NR,y}$ describe a percentage of uplink symbols actually transmitted against a user equipment capability maxUplinkDutyCycle-PC2-FR1 value for the new radio bands x and y respectively. In one or more embodiments, user equipment 120 may support a 50% maximum duty cycle in power class 2 and a 100% maximum duty cycle in power class 3 by default. In one or more embodiments, the maximum duty cycle for different power cycle may be described by maxUplinkDutyCycle-PC2-FR1. In one or more embodiments, maximum uplink duty cycles on frequency range 1 are defined for a single cell operation for supported power class 1.5 as maxUplinkDutyCycle-PC1dot5-MPE-FR1 and/or maxUplinkDutyCycle-PC2-FR1. In one or more embodiments, maximum duty cycles on frequency range 1 are defined for a single cell operation and intra-band contiguous carrier aggregation for supported power class 2 as maxUplinkDutyCycle-PC2-FR1.

The base station 140 of FIG. 1 may comprise, for example, remote radio heads (RRHs), transmission reception points (TRPs), access points, node Bs (e.g., gNB) or other transmission sources. The base station 140 may be configured to communicate with user equipment 120 via a network.

FIG. 2 depicts an example apparatus 200 that may be configured to function as user equipment 120 or base station 140. As shown in FIG. 2, the apparatus includes, is associated with, or is in communications with processing circuitry 220, a memory 240, and a communication interface 260. The processing circuitry 220 may be in communication with the memory device 240 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 200 may, in some embodiments, be embodied in various computing devices described as above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processing circuitry 220, also referenced as a processor, may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining, and/or multithreading.

In an example embodiment, the processing circuitry 220 may be configured to execute instructions stored in the memory device 240 or otherwise accessible to the processing circuitry. Alternatively or additionally, the processing circuitry may be configured to execute hardcoded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 260 may be any means such as a device or circuitry embodied in either hardware or a combination of hardware and software that is configured to receive and/or transmit data including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communications interface may alternatively or also support wired communication. As such, for example, the communication interface may include a communication modem and/or other hardware/software for supporting communication via cable, digital subscriber line (DSL), universal serial bus (USB) or other mechanisms.

Turning now to FIG. 3, a signaling diagram illustrates a process 300 for adjusting uplink transmission scheduling based on user equipment 120 exceeding a threshold duty cycle. In this example embodiment, the user equipment 120 is connected to a base station 140, e.g, a gNB. In one or more embodiments, process 300 allows a base station 140 to avoid power class fallback for the user equipment 120 based on a report transmitted by the user equipment 120.

In one or more embodiments, at operation 310, user equipment 120 transmits a message to the base station 140 comprising information about the capability of the user equipment 120. In one or more embodiments, the message transmitted by the user equipment 120 may comprise information about at least one of a power class or a maximum duty cycle associated with the user equipment 120.

In one or more embodiments, at operation 320, the base station 140 configures a threshold duty cycle for the user equipment 120. In one or more embodiments, the threshold duty cycle describes a threshold transmitted uplink symbol percentage value. In one or more embodiments, the duty cycle threshold represents a threshold percentage of uplink symbols transmitted by the user equipment 120 during an evaluation period. In one or more embodiments, the evaluation period is greater than or equal to 10 ms. In one or embodiments, the threshold duty cycle is lower than the maximum duty cycle. In one or more embodiments, the threshold is lower than user equipment capability maxUplinkDutyCycle, which triggers, when exceeded, power class fallback for user equipment 120. In one or more embodiments, the threshold duty cycle is configured as a portion of the maximum duty cycle. In one or more embodiments, the threshold duty cycle is configured to be sufficiently lower than the maximum duty cycle so as to allow base station 140 to adjust uplink scheduling when it is notified that the user equipment 120 has exceeded the threshold duty cycle. For example and without limitation, the threshold duty cycle may be 80% of the maximum duty cycle (e.g., a threshold duty cycle of 40% corresponding to a maximum duty cycle of 50%).

In one or more embodiments, at operation 330, the base station 140 schedules uplink transmission for the user equipment 120. In one or more embodiments, operation 330 further comprises the user equipment 120 transmitting uplink symbols according to the schedule set by the base station 140.

In one or more embodiments, at operation 340, the user equipment 120 compares the threshold duty cycle against the transmitted uplink symbol percentage that the user equipment 120 evaluates for the duty cycle. In one or more embodiments, the user equipment 120 evaluates the transmitted uplink symbol percentage over the course of an evaluation period.

In one or more embodiments, at operation 350, user equipment 120 transmits a report to the base station 140 that the threshold duty cycle has been exceeded. In one or more embodiments, the report comprises PHR. In one or more embodiments, other reporting may be used via medium access control (MAC) control element (CE) or physical layer control signaling. In one or more embodiments, user equipment 120 includes its current power class to the PHR for one or both serving cell(s). In one or more embodiments, user equipment 120 includes its current power class to the PHR for carrier aggregation and/or dual connectivity. In one or more embodiments, the report describes a $\Delta P_{PowerClass,\ CA}$ or $\Delta P_{PowerClass}$ value which implicitly or indirectly indicates a current power class or power class state.

In alternative embodiments, such as for example when user equipment 120 uses sliding evaluation periods, user equipment 120 may only send a report to the base station 140 when a preconfigured time interval has passed and/or when a change in transmitted uplink symbol percentage is greater than a threshold of change compared to the transmitted uplink symbol percentage in a previous report. In one or more embodiments, the preconfigured time period is configured via radio resource control signaling. In one or more embodiments, the preconfigured time period is hard-coded in a specification. In one or more embodiments, the preconfigured time period is based on the evaluation period. In an example embodiment, user equipment 120 may use a preconfigured time period or threshold of change when the transmitted uplink symbol percentage exceeds the duty cycle threshold continuously in a short period.

In one or more embodiments, at operation 360, base station 140 determines not to make user equipment 120 fall back to a lower power class.

In one or more embodiments, at operation 370, base station 140 adjusts uplink scheduling for the user equipment 120 based on the decision reached in operation 360 to not make user equipment 120 fall back. In one or more embodiments, base station 140 schedules less uplink transmission for user equipment 120. In one or more embodiments, user equipment 120 transmits a lower percentage of uplink symbols during an evaluation period according to the new scheduling. In one or more embodiments, the base station 140 schedules (and user equipment 120 transmits) a lower percentage of uplink symbols compared to before the user equipment 120 transmitted the report to the base station 140.

In one or more embodiments, at operation 380, user equipment 120 continues to operate at the power class originally indicated to the base station 140 at operation 310.

FIG. 4 illustrates an example alternative process 400 wherein base station 140 determines to continue at current scheduling despite a consequent power class fallback by the user equipment 120. In one or more embodiments, process 400 includes operations 310-350 and picks up after the report is transmitted to the base station 140.

In one or more embodiments, at operation 410, base station 140 determines to not alter uplink transmission scheduling for the user equipment 120. In one or more embodiments, this can trigger power class fallback by the user equipment 120.

In one or more embodiments, at operation 420, the user equipment 120 determines that a transmitted uplink symbol percentage has exceeded the maximum duty cycle over the course of the evaluation period. In one or more embodiments, this triggers a power class fallback by the user equipment 120, for example, from power class 2 to power class 3.

In one or more embodiments, user equipment 120 determines a time estimate for when the user equipment 120 can return to the higher power class. In one or more embodiments, for example when the user equipment 120 uses sequential and non-overlapping evaluation periods, the time estimate for returning to the higher power class is the time to the start of the next evaluation period. In one or more embodiments, for example when the user equipment 120 uses sliding evaluation periods, user equipment 120 calculates the time estimate by assuming a predefined or preconfigured uplink activity (e.g., that uplink is not scheduled to the user equipment 120, or that user equipment's uplink is scheduled with a pre-configured minimal ratio or percentage of uplink symbols).

In one or more embodiments, at operation 430, the user equipment 120 reports the fallback power class and time estimate for return to the higher power class to the base station 140. In one or more embodiments, the report comprises PHR. In one or more embodiments, the user equipment 120 reports a $\Delta P_{PowerClass,\ CA}$ or $\Delta P_{PowerClass}$ value which implicitly or indirectly indicates a fallback power class or power class state.

In one or more embodiments, at operation 440, the base station 140 adjusts scheduling to adapt to the power class fallback by the user equipment 120. In one or more embodiments, the base station 140 adjusts link adaptation based on the power class fallback by user equipment 120.

Turning now to FIG. 5, a signal diagram illustrating a process 500 for a base station 140 estimating the evaluation period for user equipment 120 is illustrated.

In one or more embodiments, at operation 510, user equipment 120 transmits a message to the base station 140 comprising information about the capability of the user equipment 120. In one or more embodiments, the message transmitted by the user equipment 120 may comprise information about at least one of a power class or a maximum duty cycle. In one or more embodiments, the user equipment 120 indicates to the base station 140 whether its evaluation periods are sliding or sequential.

In one or more embodiments, at operation 520, the base station 140 causes transmission of a repeated report request to the user equipment 120. In one or more embodiments, the report request configures the user equipment 120 to perform reporting periodically. For example, the user equipment 120 may be configured to perform reporting via power headroom reporting. As another example, the user equipment 120 may be configured to perform reporting via MAC CE.

In one or more embodiments, the user equipment 120 may be configured to perform reporting via physical layer control signaling. In one or more embodiments, the user equipment 120 may be configured to perform a report at the end of an evaluation period, for example, on the last physical uplink shared channel at the end of the evaluation period. In one or more embodiments, the user equipment 120 may be configured to perform a report on the first physical uplink shared channel of a subsequent evaluation period after the relevant evaluation period. In one or more embodiments, the user equipment 120 may be configured to perform a report comprising the user equipment's power class for both the serving cell(s) as well as for the inter-band carrier aggregation, if applicable. In one or more embodiments, the user equipment 120 may be configured to perform a report comprising the percentage of uplink symbols transmitted within the evaluation period. In one or more embodiments, user equipment 120 is configured to transmit a report after a preconfigured time period has passed from a previous report. In one or more embodiments, the preconfigured time period is configured via radio resource control signaling. In one or more embodiments, the preconfigured time period is hardcoded in a specification. In one or more embodiments, the preconfigured time period is based on the evaluation period. In one or more embodiments, the user equipment 120 is configured to perform the report only when there a preconfigured difference is observed between the content of a previous report and what would be the content of a new report. In one or more embodiments, the preconfigured difference comprises a difference in PHR content. In one or more embodiments, the preconfigured difference is configured via radio resource control signaling. In one or more embodiments, the preconfigured difference is hardcoded in a specification.

In one or more embodiments, at operation 530, the base station 140 schedules uplink transmission for the user equipment 120. In one or more embodiments, operation 530 further comprises the user equipment 120 transmitting uplink symbols according to the schedule set by the base station 140.

In one or more embodiments, at operation 540, the user equipment 120 determines that the end of an evaluation period has been reached. In one or more embodiments, the user equipment 120 further determines whether a set of conditions are satisfied. In an example embodiment where the user equipment 120 uses a sliding evaluation report, the set of conditions comprises a preconfigured time period that has passed from the last report and a preconfigured difference between the content of a previous report and what would be the content of a new report. In alternative embodiments, one of either a preconfigured time period or a preconfigured difference being satisfied may trigger a report. In one or more embodiments, the user equipment 120 may perform a report after every preconfigured time period. In one or more embodiments, this time period may be based on the evaluation period.

In one or more embodiments, at operation 550, user equipment 120 performs a report containing, for example, a power class and a percentage of uplink symbols within an evaluation period. In one or more embodiments, the user equipment 120 performs the report via power headroom reporting. As another example, the user equipment 120 performs the report via MAC CE or physical layer control signaling. In one or more embodiments, the report describes a $\Delta P_{PowerClass,\ CA}$ or $\Delta P_{PowerClass}$ value which implicitly or indirectly indicates a current power class or power class state. In one or more embodiments, the user equipment 120 performs the report at the end of the evaluation period, for example, on the last physical uplink shared channel at the end of the evaluation period. In one or more embodiments, the user equipment 120 performs the report on the first physical uplink shared channel of a subsequent evaluation period after the evaluation period. In one or more embodiments, the user equipment 120 performs the report comprising the user equipment's power class for both the serving cell(s) as well as for the inter-band carrier aggregation, if applicable. In one or more embodiments, the user equipment 120 performs the report comprising the percentage of uplink symbols within the evaluation period. In one or more embodiments, user equipment 120 causes transmission of the report after a preconfigured time period has passed from a previous report. In one or more embodiments, the preconfigured time period is configured via radio resource control signaling. In one or more embodiments, the preconfigured time period is hardcoded in a specification. In one or more embodiments, the preconfigured time period is based on the evaluation period. In one or more embodiments, the user equipment 120 is configured to perform the report only when a preconfigured difference is observed between the content of a previous report and what would be the content of a new report. In one or more embodiments, the preconfigured difference comprises a PHR difference. In one or more embodiments, the preconfigured difference is configured via radio resource control signaling. In one or more embodiments, the preconfigured difference is hardcoded in a specification.

In one or more embodiments, at operation 560, base station 140 estimates the user equipment's evaluation period parameters based on the report performed by the user equipment 120. In one or more embodiments, base station 140 estimates the evaluation period based on at least one of the amount of time since the previous report, a power class indicated in the report, or a percentage of uplink symbols indicated in the report. In one or more example embodiments, base station 140 continues to update its estimate of the evaluation period over time as more reports are received.

In one or more embodiments, at operation 570, a base station 140 determines that its evaluation period estimate is sufficiently accurate. In one or more embodiments, the base station 140 determines that a threshold level of accuracy has been reached. In one or more embodiments, the base station 140 adjusts uplink scheduling based on the estimation of the evaluation period. In one or more embodiments, the base station 140 determines that repeated reporting is no longer needed. In one or more embodiments, base station 140 determines that PHR reporting from the user equipment 120 is no longer needed. In one or more embodiments, base station 140 configures a modified report request for transmission to user equipment 120.

In one or more embodiments, at operation 580, base station 140 causes transmission of a modified report request to user equipment 120. In one or more embodiments, user equipment 120 is configured to stop reporting. In one or more embodiments, user equipment 120 is configured to re-configure reporting. In one or more embodiments, the base station 140 reconfigures the reporting from the user equipment 120. In one or more embodiments, user equipment 120 is configured to reconfigure PHR reporting. In one or more embodiments, the base station 140 is reconfigures PHR reporting from the user equipment 120.

Turning now to FIG. 6, an example flowchart is illustrated for a process 600 performed by an apparatus embodied by, associated with or otherwise in communication with (hereinafter generally referenced as being embodied by) a base station 140 to receive a report that threshold duty cycle has been exceeded by the user equipment 120 is shown.

As shown in block 610 of FIG. 6, the apparatus embodied by the base station 140 includes means, such as the processing circuitry 220, the communication interface 260, or the like, for receiving a message comprising information about at least one of a first power class or a maximum duty cycle associated with user equipment 120.

As shown in block 620 of FIG. 6, the apparatus embodied by the base station 140 includes means, such as the processing circuitry 220, the communication interface 260, or the like, for determining, based at least on the first power class or the maximum duty cycle, a threshold duty cycle for the user equipment 120. In one or more embodiments, the threshold duty cycle comprises a transmitted uplink symbol percentage value. In one or more embodiments, the threshold duty cycle comprises a portion of the maximum duty cycle. In one or more embodiments, the threshold duty cycle comprises a percentage of uplink symbols transmitted during an evaluation period. In one or more embodiments, the threshold duty cycle may be close to the maximum duty cycle. This may be technically advantageous in that excess signaling is reduced. In one or more embodiments, the threshold duty cycle may be further away from the maximum duty cycle. This may be technically advantageous in that it gives time for PHR reporting and for the base station 140 to react to the PHR report before the user equipment 120 falls back to a lower power class.

As shown in block 630 of FIG. 6, the apparatus embodied by the base station 140 includes means, such as the processing circuitry 220, the communication interface 260, or the like, for causing the threshold duty cycle to be transmitted to the user equipment 120.

As shown in block 640 of FIG. 6, the apparatus embodied by the base station 140 includes means, such as the processing circuitry 220, the communication interface 260, or the like, for determining an uplink transmission schedule for the user equipment 120 based at least on the first power class or the maximum duty cycle.

As shown in block 650 of FIG. 6, the apparatus embodied by the base station 140 includes means, such as the processing circuitry 220, the communication interface 260, or the like, for receiving, from the user equipment 120, a report that the threshold duty cycle has been exceeded by the user equipment 120. In one or more embodiments, the apparatus embodied by the base station 140 further includes means, such as the processing circuitry 220, the communication interface 260, or the like, for determining whether to modify the uplink transmission schedule based at least on the report. In one or more embodiments, the apparatus embodied by the base station 140 further includes means, such as the processing circuitry 220, the communication interface 260, or the like, for determining whether the uplink transmission schedule should not be modified based at least on the report. In one or more embodiments, the report comprises a power headroom report. In one or more embodiments, the report is performed via MAC CE. In one or more embodiments, the report is performed via physical layer control signaling. In one or more embodiments, the report is received after a preconfigured time period. In one or more embodiments, the preconfigured time period is resource radio control configured. In one or more embodiments, the preconfigured time period is hardcoded in a specification. In one or more embodiments, the preconfigured time period is based on the evaluation period. In one or more embodiments, the report is received as a result of a preconfigured difference being met between the report and a previous report. In one or more embodiments, the report comprises a power class associated with the user equipment 120 for both serving cell(s). In one or more embodiments, the report comprises a power class associated with the user equipment 120 for carrier aggregation and/or dual connectivity.

As shown in optional block 660 of FIG. 6 as indicated by the dashed outline, the apparatus embodied by the base station 140 includes means, such as the processing circuitry 220, the communication interface 260, or the like, for receiving, from the user equipment 120, a second report comprising a second power class and a time estimate of return to the first power class. In one or more embodiments, the second report may comprise a power headroom report. In one or more embodiments, the second report contains one or two bits for indicating a current power class. In one or more embodiments, the current power class is indicated per serving cell. In one or more embodiments, the current power class is indicated for inter-band carrier aggregation. In one or more embodiments, the second report comprises an additional two bits for indicating the estimated timing for returning the advertised power class with states. In one or more embodiments, the time estimate is determined based on the evaluation period. In one or more embodiments, the time estimate is determined based on assuming a level of preconfigured uplink activity.

As shown in optional block 670 of FIG. 6, the apparatus embodied by the base station 140 includes means, such as the processing circuitry 220, the communication interface 260, or the like, for modifying the uplink transmission schedule based at least on the second report. In one or more embodiments, the base station 140 further includes means, such as the processing circuitry 220, the communication interface 260, or the like, for modifying link adaptation based at least on the second report.

Turning now to FIG. 7, an example flowchart is illustrated for a process 700 performed by an apparatus embodied by, associated with or otherwise in communication with (hereinafter generally referenced as being embodied by) a user equipment 120 to cause transmission of a report that a threshold duty cycle has been exceeded to a base station 140.

As shown in block 710 of FIG. 7, the apparatus embodied by the user equipment 120 includes means, such as the processing circuitry 220, the communication interface 260, or the like, for causing transmission of a message comprising information about at least one of a first power class or a maximum duty cycle to a base station 140. In one or more embodiments, the apparatus embodied by the user equipment 120 includes means, such as the processing circuitry 220, the communication interface 260, or the like, for applying the first power class on following transmissions to the base station 140. In one or more embodiments, the apparatus embodied by the user equipment 120 includes means, such as the processing circuitry 220, the communication interface 260, or the like, for determining transmission power based at least on the first power class.

As shown in block 720 of FIG. 7, the apparatus embodied by the user equipment 120 includes means, such as the processing circuitry 220, the communication interface 260, or the like, for receiving a threshold duty cycle from the base station 140. In one or more embodiments, the threshold duty cycle comprises a transmitted uplink symbol percentage value. In one or more embodiments, the threshold duty cycle comprises a portion of the maximum duty cycle. In one or more embodiments, the threshold duty cycle comprises a percentage of uplink symbols transmitted during an evaluation period. In one or more embodiments, the threshold duty cycle may be close to the maximum duty cycle. This may be technically advantageous in that excess signaling is reduced. In one or more embodiments, the threshold duty cycle may be further away from the maximum duty cycle. This may be technically advantageous in that it gives time for PHR reporting and for the base station 140 to react to the PHR report before the user equipment 120 falls back to a lower power class.

As shown in block 730 of FIG. 7, the apparatus embodied by the user equipment 120 includes means, such as the processing circuitry 220, the communication interface 260, or the like, for determining that the threshold duty cycle has been exceeded.

As shown in block 740 of FIG. 7, the apparatus embodied by the user equipment 120 includes means, such as the processing circuitry 220, the communication interface 260, or the like, for causing transmission of a report that the threshold duty cycle has been exceeded to the base station 140. In one or more embodiments, the report comprises a power headroom report. In one or more embodiments, the report is performed via MAC CE. In one or more embodiments, the report is performed via physical layer control signaling. In one or more embodiments, the report is transmitted after a preconfigured time period. In one or more embodiments, the preconfigured time period is resource radio control configured. In one or more embodiments, the preconfigured time period is hardcoded in a specification. In one or more embodiments, the preconfigured time period is based on the evaluation period. In one or more embodiments, the report is transmitted based on a preconfigured difference between the report and a previous report. In one or more embodiments, the report comprises a power class associated with the user equipment 120 for both serving cell(s). In one or more embodiments, the report comprises a power class associated with the user equipment 120 for carrier aggregation and/or dual connectivity.

As shown in optional block 750 of FIG. 7, the apparatus embodied by the user equipment 120 includes means, such as the processing circuitry 220, the communication interface 260, or the like, for determining that the maximum duty cycle has been exceeded.

As shown in optional block 760 of FIG. 7 as evidenced by the dashed outline, the apparatus embodied by the user equipment 120 includes means, such as the processing circuitry 220, the communication interface 260, or the like, for determining a time estimate of return to the first power class. In one or more embodiments, the time estimate is determined based upon the evaluation period. In one or more embodiments, the time estimate is determined by assuming a predefined or configured uplink activity.

As shown in optional block 770 of FIG. 7, the apparatus embodied by the user equipment 120 includes means, such as the processing circuitry 220, the communication interface 260, or the like, for configuring a second report comprising a second power class and the time estimate of return to the first power class. In one or more embodiments, the second power class has a lower maximum transmission power than the first power class. In one or more embodiments, the second report may comprise a power headroom report. In one or more embodiments, the second report contains one or two bits for indicating a current power class. In one or more embodiments, the current power class is indicated per serving cell. In one or more embodiments, the current power class is indicated for inter-band carrier aggregation. In one or more embodiments, the second report comprises an additional two bits for indicating the estimated timing for returning the advertised power class with states. In one or more embodiments, the apparatus embodied by the user equipment 120 includes means, such as the processing circuitry 220, the communication interface 260, or the like, for applying the second power class on following transmissions to the base station 140. In one or more embodiments, the apparatus embodied by the user equipment 120 includes means, such as the processing circuitry 220, the communication interface 260, or the like, for determining transmission power based at least on the second power class.

As shown in optional block 780 of FIG. 7, the apparatus embodied by the user equipment 120 includes means, such as the processing circuitry 220, the communication interface 260, or the like, for causing transmission of the second report to the base station 140.

Turning now to FIG. 8, an example flowchart is illustrated for a process 800 for an apparatus embodied by a base station 140 to determine an estimated evaluation period associated with user equipment 120.

As shown in block 810 of FIG. 8, the apparatus embodied by the base station 140 includes means, such as the processing circuitry 220, the communication interface 260, or the like, for receiving a message comprising information about at least one of a first power class or a maximum duty cycle associated with the user equipment 120. In one or more embodiments, the apparatus embodied by the base station 140 includes means, such as the processing circuitry 220, the communication interface 260, or the like, for receiving, from the user equipment 120, an indication of a sliding evaluation period. In one or more embodiments, the apparatus embodied by the base station 140 includes means, such as the processing circuitry 220, the communication interface 260, or the like, for receiving, from the user equipment 120, an indication of a sequential evaluation period.

As shown in block 820 of FIG. 8, the apparatus embodied by the base station 140 includes means, such as the processing circuitry 220, the communication interface 260, or the like, for determining, based at least on the first power class or the maximum duty cycle, a repeated report request for the user equipment 120.

As shown in block 830 of FIG. 8, the apparatus embodied by the base station 140 includes means, such as the processing circuitry 220, the communication interface 260, or the like, for causing the repeated report request to be transmitted to the user equipment 120.

As shown in block 840 of FIG. 8, the apparatus embodied by the base station 140 includes means, such as the processing circuitry 220, the communication interface 260, or the like, for determining an uplink transmission schedule for the user equipment 120 based at least on the first power class or the maximum duty cycle.

As shown in block 850 of FIG. 8, the apparatus embodied by the base station 140 includes means, such as the processing circuitry 220, the communication interface 260, or the like, for receiving, from the user equipment 120, at least one report. In one or more embodiments, the at least one report comprises a power headroom report. In one or more embodiments, the report is performed via MAC CE. In one or more embodiments, the report is performed via physical layer control signaling. In one or more embodiments, the report is transmitted after a preconfigured time period. In one or more embodiments, the preconfigured time period may be based on the evaluation period. For example, the report may be performed on the last physical uplink shared channel of an evaluation period or on the first physical uplink shared channel of a subsequent evaluation period. In one or more embodiments, the preconfigured time period is resource radio control configured. In one or more embodiments, the preconfigured time period is hardcoded in a specification. In one or more embodiments, the report is transmitted based on a preconfigured difference between the report and a previous report. In one or more embodiments, the report comprises a power class associated with the user equipment 120 for both serving cell(s). In one or more embodiments, the report comprises a power class associated with the user equipment 120 for carrier aggregation and/or dual connectivity. In one or more embodiments, the report comprises a percentage of uplink symbols transmitted within an evaluation period.

As shown in block 860 of FIG. 8, the apparatus embodied by the base station 140 includes means, such as the processing circuitry 220, the communication interface 260, or the like, for determining, based on the at least one report, an estimated evaluation period associated with the user equipment 120. In one or more embodiments, the apparatus embodied by the base station 140 further includes means, such as the processing circuitry 220, the communication interface 260, or the like, for modifying the uplink transmission schedule based on the estimated evaluation period.

As shown in optional block 870 of FIG. 8, the apparatus embodied by the base station 140 includes means, such as the processing circuitry 220, the communication interface 260, or the like, for determining an accuracy level associated with the estimated evaluation period.

As shown in optional block 880 of FIG. 8, the apparatus embodied by the base station 140 includes means, such as the processing circuitry 220, the communication interface 260, or the like, for determining that the accuracy level satisfies a threshold accuracy level.

As shown in optional block 890 of FIG. 8, the apparatus embodied by the base station 140 includes means, such as the processing circuitry 220, the communication interface 260, or the like, for determining a modified report request based at least on the accuracy level satisfying the threshold accuracy level.

As shown in optional block 895 of FIG. 8, the apparatus embodied by the base station 140 includes means, such as the processing circuitry 220, the communication interface 260, or the like, for causing a modified report request to be transmitted to the user equipment 120. In one or more embodiments, the modified report request indicates that the user equipment 120 should cease transmission of reports. This may be technically advantageous because it allows for low signaling overhead over a longer period of time.

Turning now to FIG. 9, an example flowchart is illustrated for process 900 for an apparatus embodied by user equipment 120 to receive, from the base station 140, a modified report request.

As shown in block 910 of FIG. 9, the apparatus embodied by the user equipment 120 includes means, such as the processing circuitry 220, the communication interface 260, or the like, for causing transmission of a message comprising information about at least one of a first power class or a maximum duty cycle associated with user equipment 120. In one or more embodiments, the apparatus embodied by the user equipment 120 includes means, such as the processing circuitry 220, the communication interface 260, or the like, for applying the first power class on following transmissions to the base station 140. In one or more embodiments, the apparatus embodied by the user equipment 120 includes means, such as the processing circuitry 220, the communication interface 260, or the like, for determining transmission power based at least on the first power class. In one or more embodiments, the apparatus embodied by the user equipment 120 includes means, such as the processing circuitry 220, the communication interface 260, or the like, for causing transmission of an indication of a sliding evaluation period to the base station 140. In one or more embodiments, the apparatus embodied by the user equipment 120 includes means, such as the processing circuitry 220, the communication interface 260, or the like, for causing transmission of an indication of a sequential evaluation period to the base station 140.

As shown in block 920 of FIG. 9, the apparatus embodied by the user equipment 120 includes means, such as the processing circuitry 220, the communication interface 260, or the like, for receiving, from the base station 140, a repeated report request.

As shown in block 930 of FIG. 9, the apparatus embodied by the user equipment 120 includes means, such as the processing circuitry 220, the communication interface 260, or the like, for configuring at least one report comprising at least a current power class or a percentage of uplink symbols transmitted within an evaluation period. In one or more embodiments, the at least one report comprises a power headroom report. In one or more embodiments, the report is configured to be performed via MAC CE. In one or more embodiments, the report is configured to be performed via physical layer control signaling. In one or more embodiments, the report is configured to be transmitted after a preconfigured time period. In one or more embodiments, the report is configured to be transmitted based on a preconfigured difference between the report and a previous report. In one or more embodiments, the report comprises a power class associated with the user equipment 120 for both serving cell(s). In one or more embodiments, the report comprises a power class associated with the user equipment 120 for carrier aggregation and/or dual connectivity.

As shown in block 940 of FIG. 9, the apparatus embodied by the user equipment 120 includes means, such as the processing circuitry 220, the communication interface 260, or the like, for causing transmission of the at least one report to the base station 140 after a preconfigured time period. In one or more embodiments, the preconfigured time period is based on the evaluation period. For example, the report may be performed on the last physical uplink shared channel of an evaluation period or on the first physical uplink shared channel of a subsequent evaluation period. In one or more embodiments, the preconfigured time period is resource radio control configured. In one or more embodiments, the preconfigured time period is hardcoded in a specification.

As shown in block 950 of FIG. 9, the apparatus embodied by the user equipment 120 includes means, such as the processing circuitry 220, the communication interface 260, or the like, for receiving, from the base station 140, a modified report request. In one or more embodiments, the modified report request comprises instructions to cease transmission of reports. This is technically advantageous because it allows for low signaling overhead over a longer period of time As shown in optional block 960 of FIG. 9, the apparatus embodied by the user equipment 120 includes means, such as the processing circuitry 220, the communication interface 260, or the like, for configuring at least one updated report comprising at least one of an updated power class or an updated percentage of uplink symbols transmitted within the evaluation period.

As shown in optional block 970 of FIG. 9, the apparatus embodied by the user equipment 120 includes means, such as the processing circuitry 220, the communication interface 260, or the like, for determining that the at least one updated report satisfies a difference threshold with the at least one report.

As shown in optional block 980 of FIG. 9, the apparatus embodied by the user equipment 120 includes means, such as the processing circuitry 220, the communication interface 260, or the like, for causing transmission of the at least one updated report after the preconfigured time period.

As described above, a method, apparatus, and computer readable medium are disclosed in accordance with an example embodiment for facilitating network control by avoiding and scheduling around power class fallback for user equipment 120. By providing for improved communication between user equipment 120 and base station 140, the present disclosure avoids scheduling problems resulting from unexpected power class fallback of user equipment 120 without warning to a base station 140.

FIGS. 6-9 illustrate flowcharts depicting methods according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 240 of an apparatus employing an embodiment and executed by a processor 220. As will be appreciated, any such computer program instructions may be loaded into a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded into a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising:

at least one processor; and at least one memory storing instructions that, when executed by the at least one processor, cause the apparatus at least to:

cause transmission of a message comprising information about a first power class to a network element;

receive a threshold duty cycle from the network element;

receive an uplink transmission scheduling from the network element;

determine that the threshold duty cycle has been exceeded based on the uplink scheduling;

cause transmission, to the network element, of a report that the threshold duty cycle has been exceeded;

determine that an uplink symbol percentage in the report differs from an uplink symbol percentage in a previous report by a change that is greater than a threshold of change, and transmitting the report;

determine that a maximum duty cycle has been exceeded;

determine a time estimate of return to the first power class;

configure a second report comprising a second power class and the time estimate of return to the first power class; and cause transmission of the second report to the network element.

2. The apparatus according to claim 1, wherein the at least one memory and the computer program code are further configured to, with the at least one processor, cause the apparatus to fall back to the second power class.

3. The apparatus according to claim 1, wherein the threshold duty cycle comprises at least one of: an uplink symbol percentage value, or a portion of the maximum duty cycle.

4. The apparatus according to claim 1, wherein the determining that the threshold duty cycle has been exceeded based on the uplink scheduling comprises: evaluating uplink symbol percentage for a duty cycle and determining the evaluated uplink symbol percentage exceeds the threshold.

5. The apparatus according to claim 1, wherein the report comprises a power headroom report.

6. The apparatus according to claim 1, wherein the report comprises an indication of the exceeded threshold.

7. A method comprising:

causing transmission of a message comprising information about a first power class to a network element;

receiving a threshold duty cycle from the network element;

receiving an uplink transmission scheduling from the network element;

determining that the threshold duty cycle has been exceeded based on the uplink scheduling;

causing transmission, to the network element, of a report that the threshold duty cycle has been exceeded;

determining that an uplink symbol percentage in the report differs from an uplink symbol percentage in a previous report by a change that is greater than a threshold of change and transmitting the report;

determining that a maximum duty cycle has been exceeded;

determining a time estimate of return to the first power class;

configuring a second report comprising a second power class and the time estimate of return to the first power class; and causing transmission of the second report to the network element.

8. The method according to claim 7, wherein the threshold duty cycle comprises at least one of:

an uplink symbol percentage value, or a portion of the maximum duty cycle.

9. The method according to claim 7, wherein the determining that the threshold duty cycle has been exceeded based on the uplink scheduling comprises: evaluating uplink symbol percentage for a duty cycle and determining the evaluated uplink symbol percentage exceeds the threshold.

10. The method according to claim 7, wherein the report comprises a power headroom report.

* * * * *